July 25, 1967 D. D. WILLIAMS 3,333,267

ELECTRONIC DATA PROCESSING SYSTEM

Filed May 14, 1965 5 Sheets-Sheet 1

INVENTOR.
DONALD DICKINSON WILLIAMS,
BY
J. K. Haskell
ATTORNEY.

INVENTOR.
DONALD DICKINSON WILLIAMS,
BY J. K. Haskell
ATTORNEY.

INVENTOR.
DONALD DICKINSON WILLIAMS,
BY
J. K. Haskell
ATTORNEY.

INVENTOR.
DONALD DICKINSON WILLIAMS,
BY J. K. Haskell
ATTORNEY.

July 25, 1967 D. D. WILLIAMS 3,333,267

ELECTRONIC DATA PROCESSING SYSTEM

Filed May 14, 1965 5 Sheets-Sheet 5

INVENTOR
DONALD DICKINSON WILLIAMS,
BY J. K. Haskell
ATTORNEY.

United States Patent Office 3,333,267

Patented July 25, 1967

3,333,267

ELECTRONIC DATA PROCESSING SYSTEM

Donald D. Williams, Inglewood, Calif., assignor to Hughes Aircraft Company, Culver City, Calif., a corporation of Delaware Filed May 14, 1965, Ser. No. 455,823
7 Claims. (Cl. 343—17.1)

Figure 1:
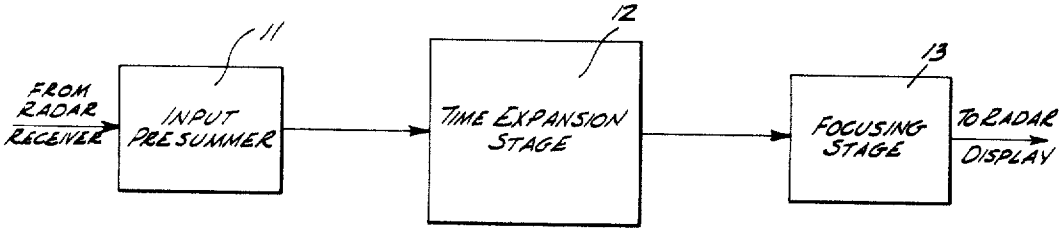

The present invention relates to an information processing system and, more particularly, to an improved system for processing radar data or information.

The processing of data or information to produce a high-resolution, synthetic-array radar generally requires a complex system which is further complicated if the array is to be focused. The term "focused array" as used in synthetic array radar systems refers to the phase-shifting of received signals to produce in-phase addition. Herebefore, array focusing has been achieved by incorporating in the processing system a large number of duplicate elements, such as sets of sweep integrators and sweeping coherent oscillators, or by employing an information storage subsystem in which the necessary information is temporarily accumulated. The information storage subsystem generally utilizes two-dimensional storage media, such as photographic film, which limits the speed with which the received information can be processed. In addition, in prior art processing systems, the problems of storing information covering a wide bandwidth for a long enough period sufficient to produce a required degree of resolution and then accurately recover the information, have not been adequately resolved.

Accordingly, it is an object of the present invention to provide a novel information processing system.

Another object of the present invention is the provision of a novel system for processing received information to produce a high-resolution synthetic-array radar.

Still another object of the invention is the provision of a novel information processing system in which information storage limitations of the prior art are substantially eliminated.

A further object of the present invention is to provide an electronic data processor in which there are incorporated fewer elements which are less complex than those used in prior art systems.

Still a further object of the present invention is the provision of a data processing system including magnetic storage means which is operable at speeds and degree of information resolution which are appreciably greater than herebefore attained.

These and other objects of the invention are achieved by providing a processing system in which information is processed and temporarily stored in a bandwidth which is related to the output bandwidth of a synthetic array, rather than the much broader bandwidth of the received or detected coherent video information. The information contained in a particular portion of each received range sweep of the radar system is further detected (analyzed). The particular portion further detected corresponds to a selected range, which is of interest. Most of the received video information is discarded and only the information within the selected range of interest is processed for focusing and display, thereby greatly reducing the amount of information which is processed and the storage capacity required therefor. Information contained within the initially received signal bandwidth includes that which is from the desired finite distance (i.e., range of interest) and from an undesired distance (i.e., range not of interest), which accounts for the broadness of bandwidth. This invention permits rejection of the undesired portion by selecting and processing of only the information from a desired distance. Since the rate of data output used in the display or the output bandwidth of a synthetic array radar is much narrower than the bandwidth of the received video information, the present invention includes a novel expansion circuit for reducing the bandwidth of the video information in such a way as to cause no loss in the information.

The lower bandwidth of the expanded video information and the limited amount of video information selected for analysis permit the use of a fast access storage medium of moderate size, such as a magnetic drum, a cylinder, tapped delay line, or magnetic core. The magnetic drum is particularly adapted to store the time-expanded video information, selected from each range sweep over a period long enough to produce a synthetic array of a selected resolution and to provide such stored information with sufficient precision and with a minimum of delay. Thus, the storage problems encountered in prior art systems are practically eliminated. In addition, the processing system of the present invention, which is analog in nature, uses fewer elements which are less complex than those employed in prior art systems.

Figure 2:
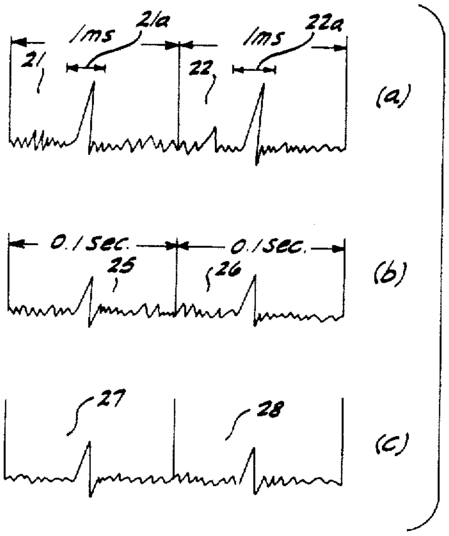
Figure 3:
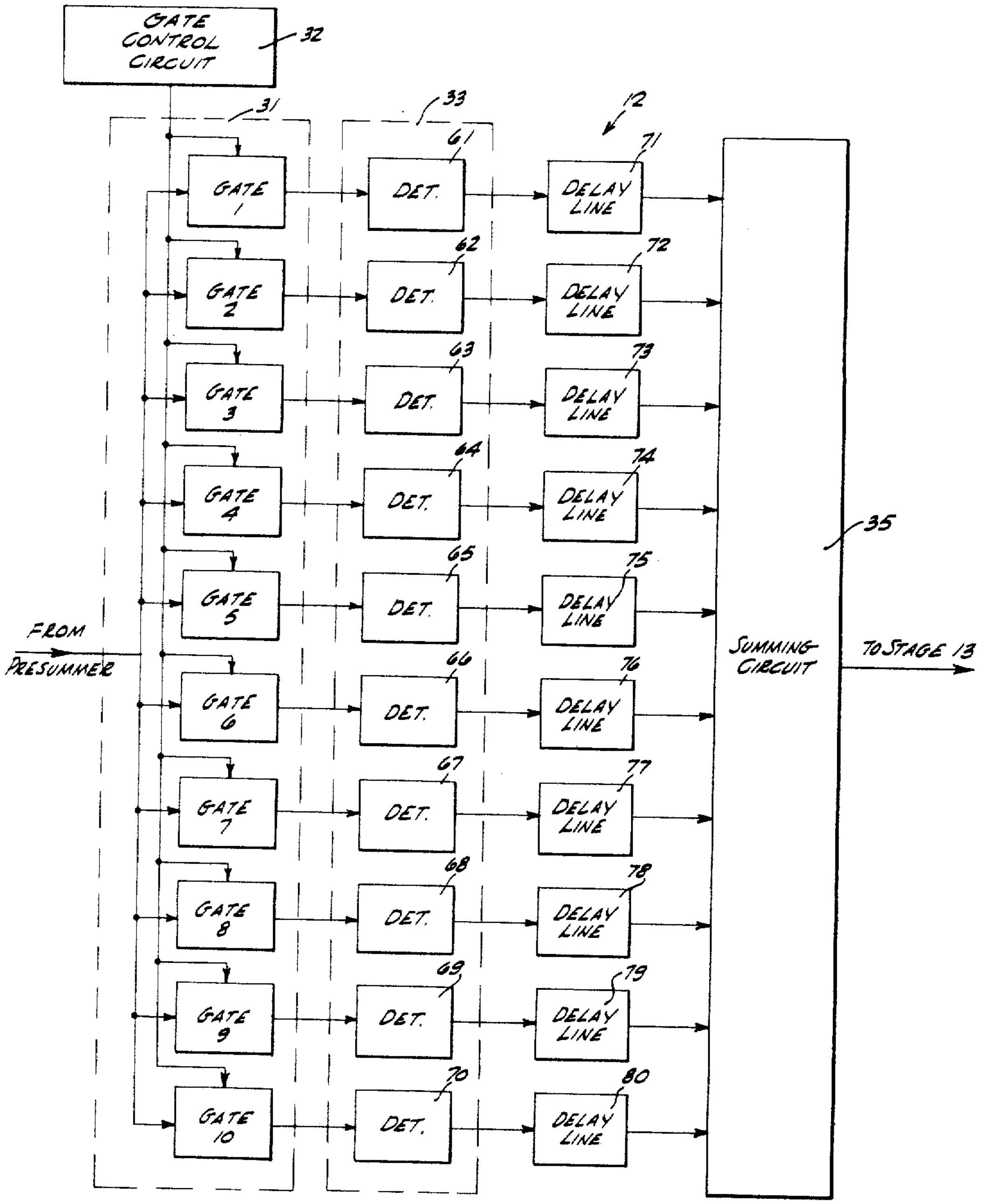
Figures 4A, 4B:
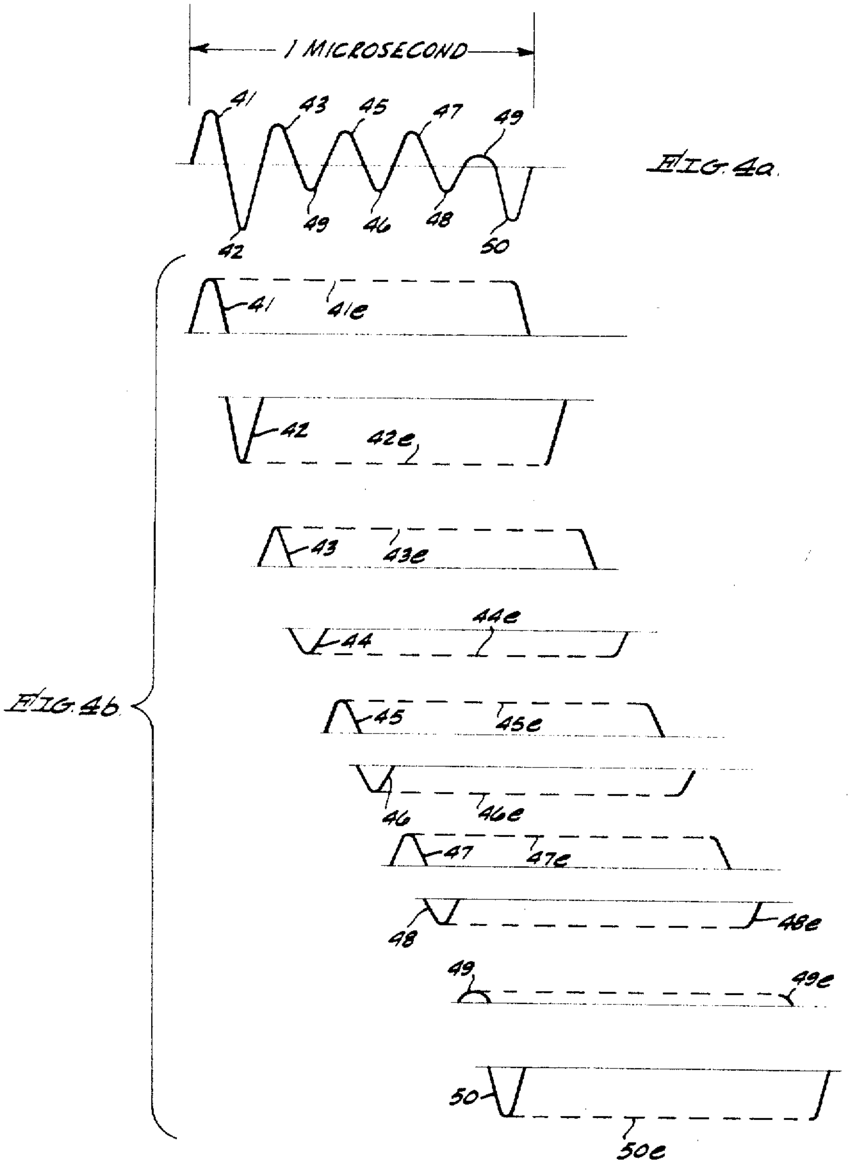
Figure 5:
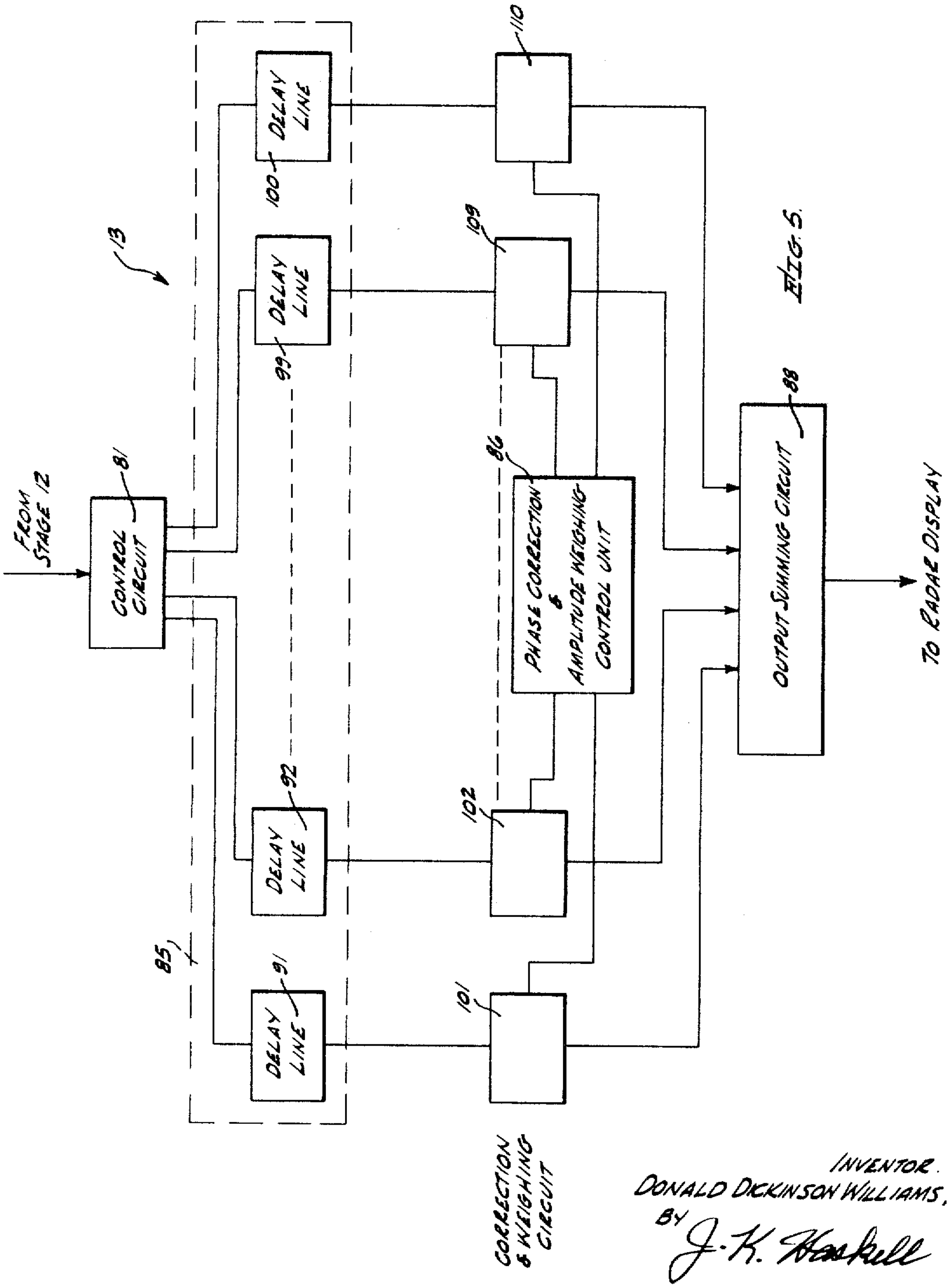
Figure 4C:
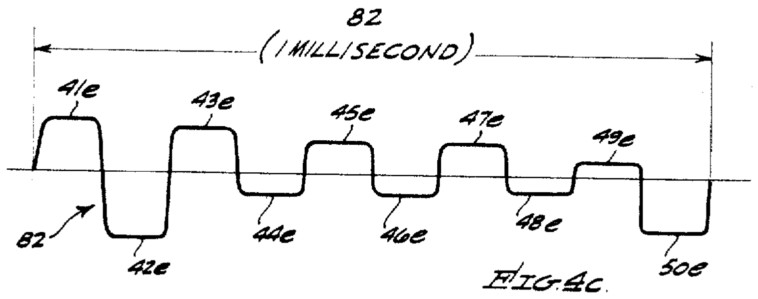

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a block diagram of the system of the present invention;

FIGURES 2*a*, 2*b* and 2*c* are waveform diagrams useful in explaining the operation of the present invention;

FIGURE 3 is a block diagram of the time-expansion stage incorporated in the system of the present invention;

FIGURES 4*a*, 4*b* and 4*c* are waveforms useful in explaining the operation of the time-expansion stage of FIGURE 3;

FIGURE 5 is a block diagram of another stage of the present invention; and

Figure 6A:
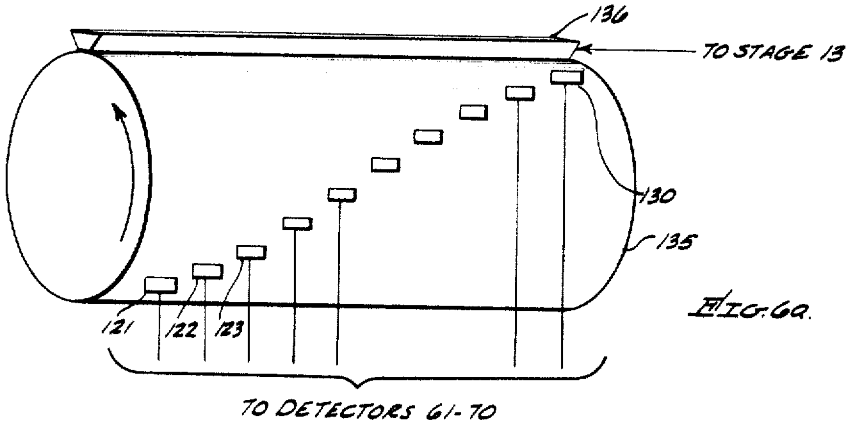
Figure 6B:
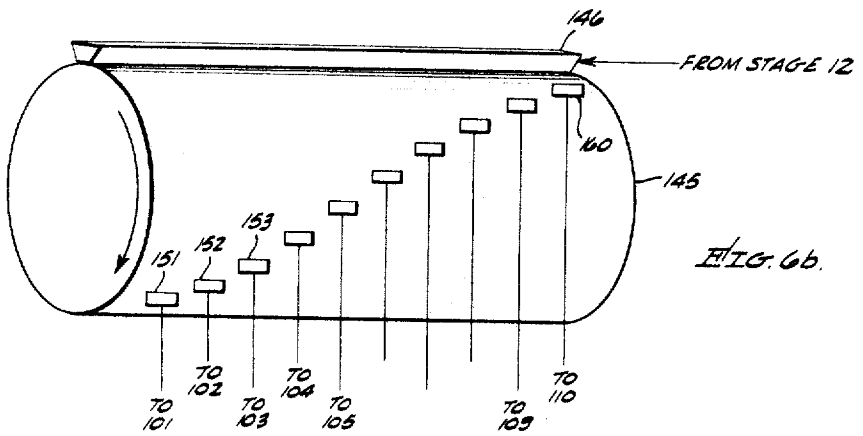

FIGURES 6*a* and 6*b* are diagrams of magnetic drums used in preferred embodiments of the system of the present invention.

Reference is now made to FIGURE 1 which is a simplified block diagram of the data processing system of the present invention. The system includes an input presummer 11 which operates as a presummer coherent sweep generator, receiving input video range sweeps from a radar receiver. As an antenna of a radar system moves in azimuth (i.e., sweeps), the transmitted energy beam strikes objects at a series of range increments, hence the term "range sweep". The reflected energy contains information from the objects struck by the radar beam within a group of range increments which are being swept by the beam. However, only the objects within the selected range increments, for example 5 to 6 miles rather than 5 to 10 miles away, may be of interest and is referred to as the "range of interest" in the radar sense. This phenomenon of radar is well known to those skilled in the radar and information extraction arts and is described in the "Radar Pocket Book" by R. S. Boulding et al., D. Van Nostrand Co., Inc., 1955, pages 6–9, page 119, and pages 126–127. However, since radar range information is a time function, any information which is a time function can be extracted in that domain. As an example, after a series of pulses are transmitted by the radar each pulse returned contains information from the same range of interest. So, by looking at the information contained in a series of pulses returning from the same range more information about the range of interest can be derived. The input presummer 11 produces output signals consisting of integrated sweeps which repeat each period of the pulse repetition frequency (prf). In any given system, the presummer is adjusted to integrate a selected number of input video range sweeps to produce a sub-array. Thus the output of the presummer changes significantly only after integrating the predetermined number of input sweeps in order to provide a succeeding sub-array.

By way of illustration and not as a limitation on the teaching disclosed herein, let it be assumed that the pulse repetition frequency (prf) is one kilocycle and the period of each output video sweep from the presummer is one millisecond (ms.). Let it further be assumed that the presummer integrates one hundred input video sweeps comprising a single sub-array so that the output thereof changes significantly only after one hundred prf periods or 0.1 second. The waveforms of two integrated output sweeps of the presummer 11 are diagrammed in FIGURE 2*a* to which reference is made herein, the sweeps being designated by reference numerals 21 and 22. For explanatory purposes, let it further be assumed that for the required resolution in range the bandwidth of the output video information from the presummer is 10 megacycles (mc.). Thus, each sub-array is generated by the presummer 11 in 0.1 second, consisting of one hundred integrated sweeps, each, one ms. long containing video information in a ten mc. band. Each sweep can be thought of as a wavetrain containing pulses at a predetermined bandwidth.

The output from the presummer is supplied to a time expansion stage 12 in which only a portion of the video information contained in each sweep is selected for analysis and expanded in time, so as to reduce the bandwidth of the particular video information which is of interest. As previously explained, generally only a portion of the received video which corresponds to a particular range of interest is used for analysis and display. Therefore, in accordance with the teachings of the present invention, the time expansion stage 12 includes circuitry which selects video information from a predetermined portion of each sweep, such as sweeps 21 and 22, and analyzes the information therein. For example, stage 12 may be designed to analyze the video information in a selected range which occupies one hundred microseconds (ms.) in each sweep, as designated by arrows **21*a* and 22*a*** in FIGURE 2*a*.

Within stage 12 during the reception of each sweep another portion of the video information contained in the selected range is expanded in time. After receiving one hundred sweeps from summer 11, stage 12 produces an output sweep hereafter also referred to as a sub-array trace of 0.1 second duration and containing the video in the particular video information received from the presummer. The term "trace" is used within this specification to mean the signal which is received between two transmitted pulses of a radar system, although in the usual sense said signal may also be used as part of an oscilloscope display. In one embodiment of stage 12, the period of each sub-array trace is 0.1 second and the bandwidth of the video information of the selected range (100 microseconds) is 10 kilocycles (kc.). Consequently, the bandwidth of the video information or pulses in the sub-array is reduced by a factor of one thousand over the bandwidth of the video information or pulses in the sweeps from the presummer. This is possible because only the information in one-tenth of the total period between pulses is processed, and any given interval of time of 0.1 microsecond in the presummer output need be sampled only one time out of 100 occurrences. In FIGURE 2b, two sub-array traces 25 and 26 of the stage 12 are diagrammed, the period of each sweep being 0.1 second and the video information or pulses in each trace having the selected duration of 100 microseconds with a bandwidth of 10 kc.

The output sub-array traces of the stage 12, are applied to a focusing stage 13. Therein, the received sub-array traces are time delayed, with respect to one another, phase corrected and summed up to provide a high resolution focused synthetic array radar signal which is in turn supplied to a radar display. Two focused synthetic array traces typical of those supplied to the display are diagrammed in FIGURE 2*c* being designated by reference numerals 27 and 28.

For a complete explanation of the operation of the time expansion stage 12, reference is made to FIGURE 3 which is a detailed block diagram thereof. As seen, each of the output range traces or sweeps from the presummer 11 is supplied to a gating circuit 31 which for explanatory purposes is shown comprising ten gates, designated GATE 1 through GATE 10. Since the bandwidth of the video in each sweep is assumed to be 10 mc., each of the gates is opened for a duration of 0.1 microsecond which corresponds to the required resolution in range of the system. The gates are contiguous in time. Namely, each gate is opened as the preceding gate is turned off or closed. The gates are connected to a gate control circuit 32 which controls the opening and closing of each of the gates. In operation, circuit 32 controls the gates so that during each sweep, the ten gates permit video information to pass therethrough which occupies one microsecond interval of the particular range of interest. During the first sweep of the hundred sweeps which comprise a sub-array supplied from the presummer, GATES 1–10 are opened to sample the video information in the first microsecond of the selected range of one hundred microseconds (see **21*a* and 22*a*** of FIGURE 2*a*). Between sweeps, the gates are moved timewise by one microsecond each pulse repetition frequency (prf) period so that during subsequent sweeps, information in succeeding portions of the selected range can be sampled.

From the foregoing, it is thus seen that after 100 sweeps or a period of 0.1 second, each range element within the selected range will be sampled by one of the gates, after 0.1 second, namely the completion of a sub-array all the gates will be reset to sample the video in a selected range of a second sub-array. Let it be assumed that during the first sweep of a given sub-array from the presummer 11, the video information in the first microsecond of the selected range has a waveform as diagrammed in FIGURE 4*a*, each of pulses 41 through 50 diagrammed therein having a 0.1 microsecond duration. Since each of GATES 1 through 10 is opened for the same duration with the gates being contiguous in time, it should be appreciated that GATE 1 will be open long enough to enable pulse 41 to pass therethrough. Similarly GATES 2 through 10 will enable pulses 42 through 50 respectively to pass therethrough.

GATES 1 through 10 are connected to detectors 61 through 70 respectively, which together comprise a detecting circuit 33. Each detector may be a boxcar detector or narrowband filter, the function of which is to expand the time duration of the pulse received from its respective gate. Thus, pulse 41 of 0.1 microsecond is expanded by detector 61 to a pulse **41*e*** of 100 microseconds, both pulses being diagrammed in FIGURE 4*b*. Namely, the detector 61 expands the duration of pulse 41 by a factor of 1000. Similarly, detectors 62 through 70 expand pulses 42 through 50 respectively and convert them into pulses **42*e* through 50*e***, each of a duration of 100 microseconds, both sets of pulses being diagrammed in FIGURE 4*b*.

The output pulses (**41*e* through 50*e*) from detectors 61 through 70 are supplied to delay lines 71 through 80 respectively. Delay line 71 produces zero delay, but each succeeding delay line has a delay of 100 microseconds greater than the preceding line. Thus, when the outputs of the lines are supplied to a summing circuit 35, the outputs are added together to produce a time expanded video trace 82** diagrammed in FIGURE 4*c*. Trace 82 comprises pulses **41*e* through 50*e*, each of a duration of 100 microseconds representing one of pulses 41 through 50**, each of which has a duration of 0.1 microsecond. Thus, the video information in the first microsecond of the selected range (FIGURE 4*a*) which is represented by pulses 41 through 50 in a bandwidth of 10 mc. is expanded into a trace of 1 millisecond comprising pulses 41*e* through 50*e* in a bandwidth of 10 kc. Trace 82 in essence comprises the first part of the sub-array trace to be produced by stage 12.

During each succeeding range sweep from presummer 11 the time expansion stage samples the video information in another microsecond of the selected range so that after 100 sweeps, which are presumed to comprise a sub-array, the summing circuit provides a complete sub-array trace such as sweep 25 (FIGURE 2*b*), in which all the video information in the 100 microsecond selected range is represented by pulses in a bandwidth of 10 kc. Thereafter, the presummer 11 generates a subsequent sub-array from which only the video information or pulses in a selected range are selected, time expanded and converted into a sub-array trace, the duration of which equals that of the sub-array, but having information or pulses in a much narrower bandwidth than the pulses in the original sweeps comprising the sub-array.

As previously explained, the output of the time expansion stage 12, namely the sub-array traces are applied to the focusing stage 13 which is diagrammed in block form in FIGURE 5 to which reference is made herein. As seen, stage 13 comprises a control circuit 81 which routes each of the sub-array traces to another delay line of unit 13. Assuming that the desired focused high resolution array radar is to comprise of the combination of ten unfocused sub-arrays, the focusing unit 13 includes ten delay lines designated in FIGURE 5 by numerals 91 through 100. The function of the delay lines 91 through 100, which together comprise a delay unit 85, is to variably delay consecutive sub-array traces from the stage 12 so that video signals therein arriving from a given selected range from each of a number of sub-arrays are simultaneously available in order to be added electronically.

The outputs of delay lines 91 through 100 are supplied to correction and weighing circuits 101 through 110 which are in turn controlled by a phase correction and amplitude weighing control unit 86, the function of unit 86 and circuits 101 through 110 is to apply a phase correction to the video information from each of the delay lines which represents the video information in a selected range of a unique sub-array generated by the presummer 11. Also, unit 86 and circuits 101 through 110 apply amplitude weighing factors necessary to properly shape the pattern of the overall synthetic array to be focused. The techniques for phase correction and amplitude weighing are well known in the art.

Circuits 101 through 110 are connected to an output summing circuit 88 in which the various outputs of the circuits are summed up to produce a summed up synthetic array trace such as trace 27 (FIGURE 2*c*). Thus, the output of stage 13 which is supplied to the radar display, comprises a focused synthetic array which consists of a number (ten) of unfocused sub-arrays.

It should be appreciated by those familiar with the art that in order to achieve focusing, it is necessary to process both phase components of the video information supplied to, and generated by, the presummer 11. This may be accomplished by incorporating two time expansion stages and two focusing stages. The outputs of the two output summing circuits of the two focusing stages are recombined to obtain resultant signal which is supplied to the radar display.

In a preferred embodiment of the present invention, the delay lines 71 through 80 and the summing circuit 35 take the form of a first magnetic drum. As seen from FIGURE 6*a* to which reference is made herein, the outputs of the detectors 61 through 70 may be supplied to a number of recording heads 121 through 130 spaced around a magnetic drum 135, the spacing between heads being a function of the time expansion produced by each detector, namely 100 microseconds and the peripheral speed of the drum. A single reading head 136 can then be used to provide the output sub-array trace of the summing circuit herebefore referred to.

The use of the magnetic drum as a storage medium is made possible by the reduced bandwidth of the summed up video information which is accomplished in the time expansion stage 12 by reducing the bandwidth of the video information or pulses from 10 mc. to 10 kc.

Similarly, the control circuit 81 and delay lines 91 through 100 of focusing stage 13 may take the form of a second magnetic drum 145, shown in FIGURE 6*b*, upon which is recorded each output sub-array trace from stage 12. The recording is accomplished by means of a recording head 146. A set of (ten) spaced reading heads 151–160 are used to variably delay each recorded output sub-array trace so that the video information from the selected range in each trace is simultaneously supplied to circuits 101 through 110.

The use of the second magnetic drum to store the video information processed from a plurality of sub-arrays is most advantageous because the magnetic drum need not be processed, which is the case when photographic film is used as the storage. Thus, the output information is made available without any appreciable delay. Also, the use of magnetic drums, made possible by reducing the bandwidth of the video information without sacrifice in range resolution, greatly reduces the number of required circuit elements as well as their complexity. For example to achieve comparable resolution to that described herebefore, namely store selected information from ten sub-arrays, each of 0.1 second duration with signals covering a 10 mc. bandwidth would require ten sweep integrators each using ten times as many circulations. In addition to incorporating magnetic drums, the analog nature of the system disclosed herein further accounts for the simplicity of the system as compared with prior art digital systems. If only a digital storage system is desired, the reduced bandwidth analog data could be converted to digital, and then by employing a circulating register, core memory storage, and access devices to accomplish similar storage and access to information for display is achieved.

There has accordingly been shown and described herein a novel and useful information processing system in which information in the form of pulse trains is expanded in time to reduce the bandwidth of the information pulses without loss in information resolution. The reduced bandwidth permits the use of fast access storage devices which greatly reduce the overall complexity of the system. It should be appreciated that those familiar with the art may make modifications in the arrangements as shown without departing from the spirit of the invention. Therefore, all such modifications are deemed to fall within the scope of the invention as claimed in the appended claims.

What is claimed is:

1. A system for processing signal information contained in a received wavetrain of transmitted energy comprising:

input means for generating information in the form of a wavetrain, each wavetrain being of a first time duration and containing signal information in a first bandwidth;

means responsive to each of said wavetrain signals for time-gated sampling the signal information in a selected portion thereof; and means for expanding the time duration of the information sampled from each wavetrain signal to change the bandwidth thereof from said first bandwidth to a second bandwidth.

2. A system for electronic processing of information signals contained in a received wavetrain of transmitted energy, comprising:

an input information presummer, said presummer being responsive to said transmitted energy and being capable of generating integrated wavetrains of the information signals of the received wavetrains, each integrated wavetrain being of a first time duration and containing signal information of a first bandwidth;

a time-duration expander, said expander being responsive to said presummer and being capable of time-expanding each integrated wavetrain information signal of a first bandwidth to a second lower bandwidth, said expander being coupled to said presummer; and means for selectively combining the time expanded wavetrain signals of the second lower bandwidth.

3. A system for electronically processing information contained in a plurality of received wavetrains of transmitted energy, the information being represented by pulses in a first bandwidth, comprising:

input means for generating integrated wavetrain signals as a function of a plurality of wavetrain signals of a first time duration received thereby;

gating means responsive to each of said integrated wavetrain signals for sampling pulses representing information in a pre-selected portion thereof;

detecting means for extending the duration of each of the pulses sampled from each of said wavetrains to vary the bandwidth of said pulses from the first bandwidth to a second narrower bandwidth;

delaying means for variably delaying the duration-extended pulses produced by said detecting means; and summing means for selectively adding the variably-delayed, duration-extended pulses to provide for each of said integrated received wavetrain signals a new wavetrain signal comprised of variably-delayed duration-extended pulses being in said second bandwidth and related to the pulses sampled therefrom.

4. A system for electronically processing information contained in a plurality of received wavetrains of transmitted energy, the information being represented by pulses in a first bandwidth, comprising:

input means for generating integrated wavetrains as a function of the plurality of wavetrains received thereby, each integrated wavetrain being of a first duration and consisting of pulses in a first bandwidth;

a plurality of gating means for sampling the pulses in a portion of each integrated wavetrain;

means for controlling said gating means to sample pulses representing information in a selected part of each integrated wavetrain;

a plurality of detecting means each connected to another of said gating means for extending the duration of the pulse sampled by the corresponding gating means to a pre-determined time duration, so as to lower the bandwidth thereof from said first bandwidth to a second lower bandwidth; and output means including a plurality of delaying means for variably delaying the pulses having the duration thereof extended by said plurality of detecting means for providing an output wavetrain comprising pulses of extended time duration in a second bandwidth, the duration of said output wavetrains being a function of the part of the integrated wavetrains sampled by said plurality of gating means and the pre-determined time duration by which each pulse sampled by each gating means is extended.

5. A system for processing information as recited in claim 4 wherein said output means comprise a magnetic storage means for recorded storage of a time-expanded wavetrain.

6. A system for processing information as recited in claim 5 wherein said output means comprise magnetic drum storage means, a plurality of recording heads and a reading head, each recording head being connected to another of said detecting means to variably delay the pulses having an extended time-duration.

7. In a system wherein video information is contained in a series of sequentially generated traces is analyzed, the information in each trace being represented by pulses in a first bandwidth, each trace being of a controlled pre-determined duration, the improvement comprising:

means for analyzing each trace to sample the pulse in a selected portion thereof;

means for time-duration expanding each of said sampled pulses;

means to differentially-delay the time-expanded sampled pulses to produce an output trace comprising said time-expanded sampled pulses in a second bandwidth lower than said first bandwidth.

References Cited

UNITED STATES PATENTS 3,044,045 7/1962 Kemp ........... 343—17.1 X

RODNEY D. BENNETT, *Primary Examiner.*